United States Patent [19]

Lalanne

[11] 4,277,097
[45] Jul. 7, 1981

[54] VEHICLE HAVING A REAR DECK FOR COVERING A LUGGAGE BOOT

[75] Inventor: Andre P. Lalanne, Le Mesnil St-Denis, France

[73] Assignees: Société Anonyme Automobiles Citroen; Société dite: Automobile Peugeot, both of Paris, France

[21] Appl. No.: 59,052

[22] Filed: Jul. 19, 1979

[30] Foreign Application Priority Data

Jul. 21, 1978 [FR] France ................................ 78 22533

[51] Int. Cl.³ .............................................. B60R 5/04
[52] U.S. Cl. .............................. 296/37.16; 224/42.42
[58] Field of Search ........................... 296/37.16, 37.1; 224/42.42 R

[56] References Cited

U.S. PATENT DOCUMENTS

| | | | |
|---|---|---|---|
| 2,889,097 | 6/1959 | Broehl | 296/37.16 |
| 2,934,248 | 4/1960 | Lown | 224/42.42 R |
| 4,168,094 | 9/1979 | Yagi | 296/37.16 |

FOREIGN PATENT DOCUMENTS

| | | | |
|---|---|---|---|
| 2123462 | 1/1972 | Fed. Rep. of Germany | 296/37.16 |
| 1514334 | 6/1978 | United Kingdom | 296/37.16 |

Primary Examiner—Robert R. Song
Attorney, Agent, or Firm—Karl F. Ross

[57] ABSTRACT

A vehicle has a rear deck for covering a luggage boot. The deck is formed by a removable shelf adjacent the back of the rear seat and which covers a part of the boot and a roller curtain which can be extended to cover the remainder of the boot. The shelf also carries at least one roller blind, in the form of a sun blind, which can be extended to lie in front of the rear window.

8 Claims, 8 Drawing Figures

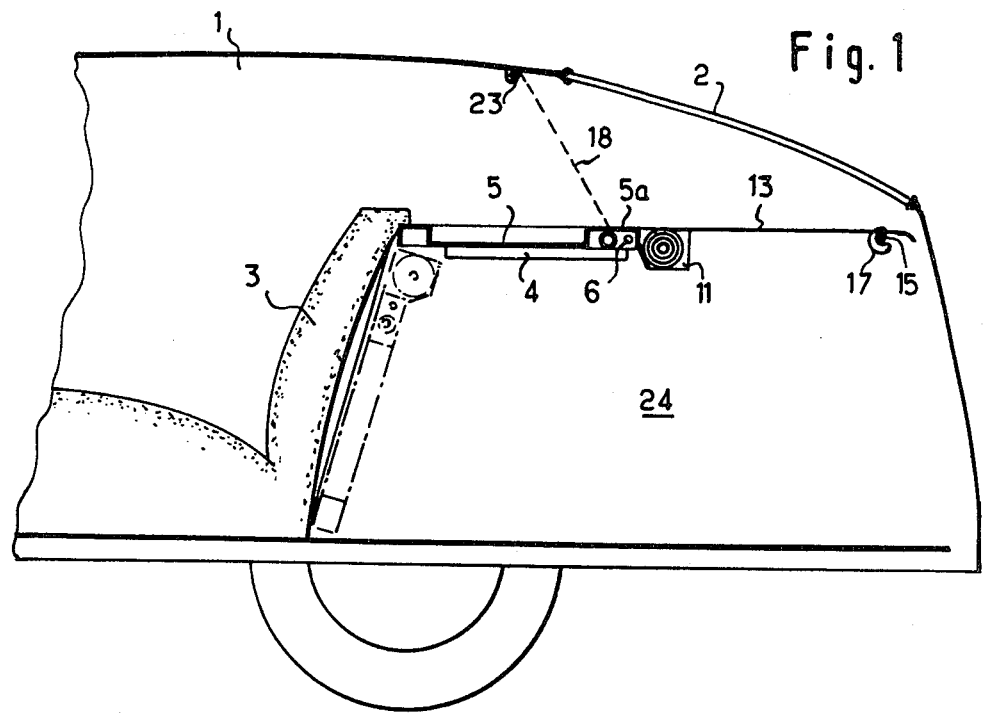
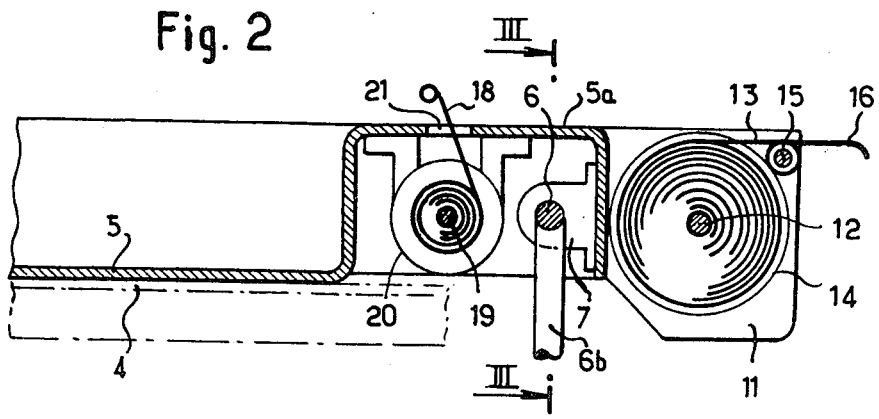
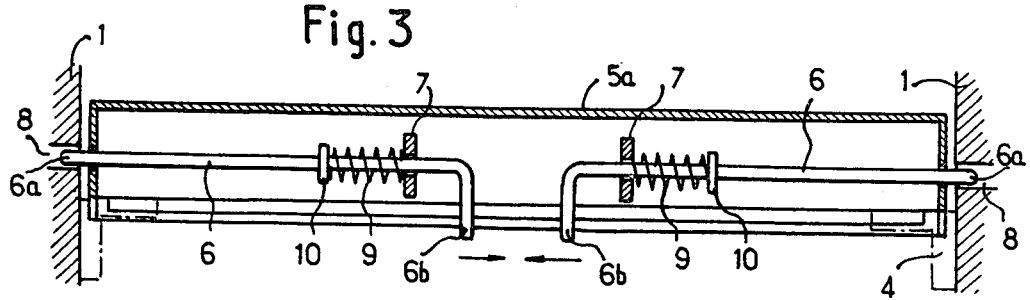

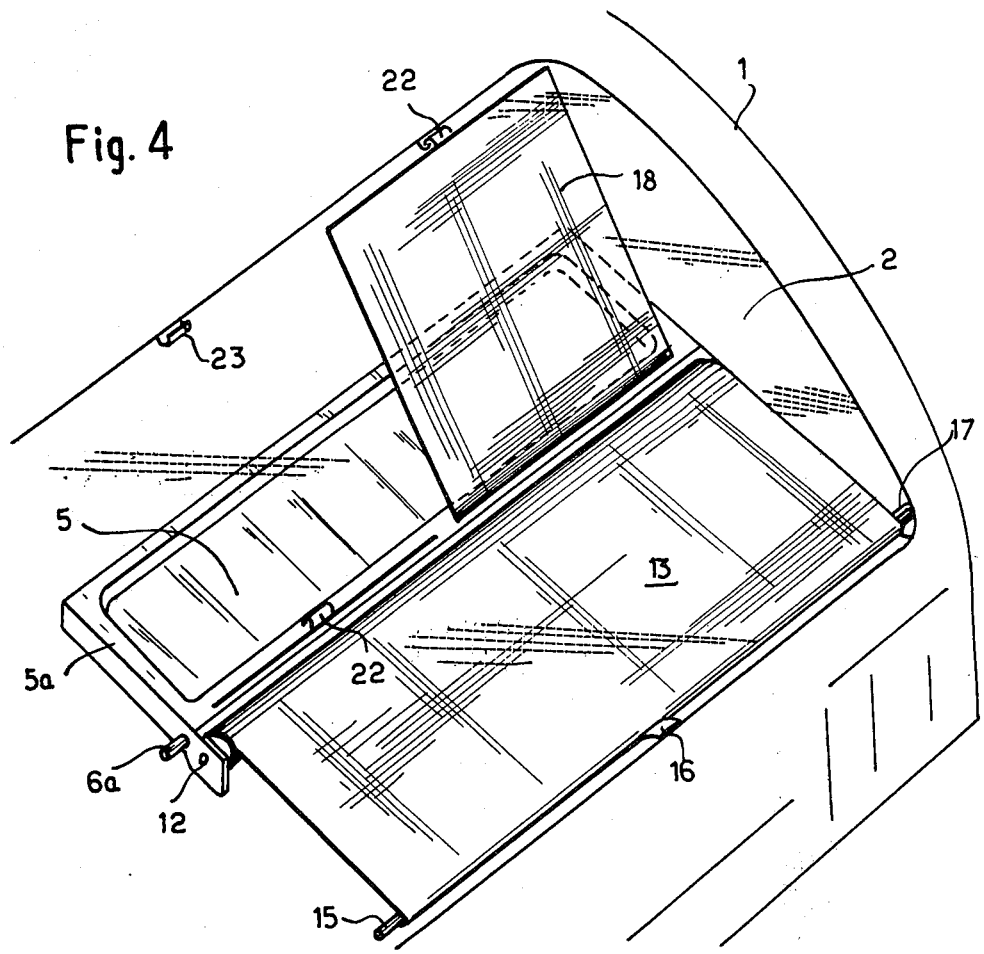
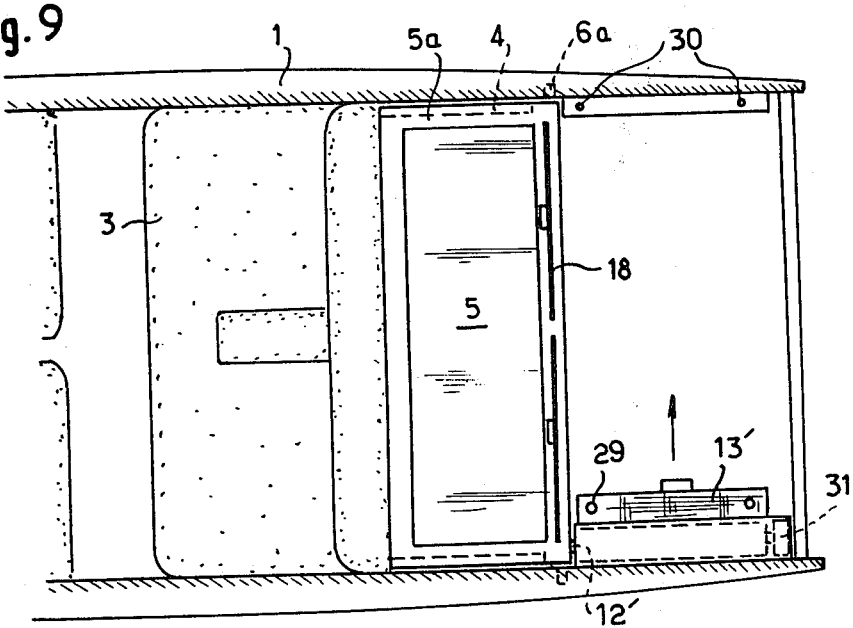

VEHICLE HAVING A REAR DECK FOR COVERING A LUGGAGE BOOT

1. FIELD OF THE INVENTION

The present invention relates to vehicles, and more particularly to automobiles.

2. FIELD OF THE INVENTION

Automobiles frequently have, in front of the rear window, a deck on which objects can be stored, and which hides the luggage boot. If the boot is of substantial size as is likely in family automobiles, a relatively extensive rear deck is required.

It has been proposed to use as the rear deck, a rigid shelf fixed to the boot or to the body of the vehicle in a removable manner in the immediate vicinity of the top part of the back of the rear seat, and the dimension of which along the longitudinal direction of the vehicle is shorter than that of the luggage boot, and, in addition, a flexible curtain which may be spread behind the shelf to cover the remaining part of the boot.

OBJECT OF THE INVENTION

An object of the present invention is to provide an improved rear deck of the above general type.

SUMMARY OF THE INVENTION

According to the invention, there is provided in a vehicle, a body having a roof, a rear window and a luggage boot, a rear seat having an upper part and a back, a rigid shelf removably fixed to the body in the immediate vicinity of the upper part of the back of the rear seat to extend rearwardly over part of the boot, the length of the shelf in the longitudinal direction of the vehicle being less than that of the luggage boot, a flexible roller curtain which can be spread behind said shelf to cover the remaining part of the boot and to define with the shelf a rear deck, the flexible roller curtain having an automatic return, and at least one roller behind in addition to the curtain, in the form of a sun blind with automatic return. The sun blind is carried by the rear portion of the shelf and has a free edge which, in the extended position of the blind, is located under the roof of the vehicle in front of the upper edge of the rear window. Means is provided for fixing the free edge in the extended condition of the blind.

The roller shaft of the curtain may be supported by the rear portion of the shelf, such that the curtain can be extended longitudinally of the vehicle. Alternatively it may be supported by the body of the vehicle, behind the shelf, such that the curtain can extend transversely of the vehicle.

Provision may be made for slides fixed to the side walls of the vehicle body, and on which the shelf may be placed through a translatory movement, the shelf being locked in its final position by resilient locking means. The shelf may also rest on supports fixed to the side walls, its front edge being embedded under the top part of the back of the seat or under a holding member disposed behind the seat back, the shelf carrying at its rear portion retractable fixing studs or fingers engageable into openings provided in the side walls. The shelf may also rest at its corners on brackets rigid with the body of the vehicle, and can be fixed to the brackets by means of easily removable pins of synthetic plastics material.

The shelf may be trough-shaped with an upstanding peripheral edge portion. In this case, the roller shaft of the sun blind is advantageously housed in the peripheral edge portion at the rear of the shelf.

BREIF DESCRIPTION OF THE DRAWING

Embodiments of the invention will now be described, by way of example only, with reference to the accompanying diagrammatic drawing, in which:

FIG. 1 is a cross-section of the rear part of the vehicle having a first embodiment of a rear deck in accordance with the invention;

FIG. 2 shows a detail of FIG. 1 drawn to a larger scale;

FIG. 3 is a section taken on line III—III of FIG. 2;

FIG. 4 is a perspective of the rear deck of the vehicle;

FIG. 9 is a plan view showing another embodiment of the rear deck.

SPECIFIC DESCRIPTION

Figure 5:
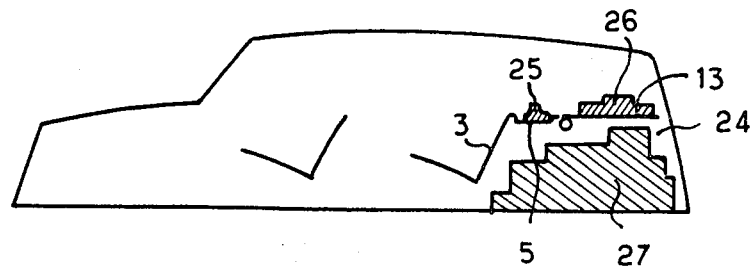
FIGS. 5 to 7 are diagrams showing the rear deck under various conditions of use.

In FIG. 1 there is shown the rear part of an automobile, including a body 1, a rear window 2, and a rear seat 3.

There is placed on angled supporting brackets 4 fixed to the walls of the body 1 behind the seat 3, a troughed shelf 5 which is provided with an upstanding peripheral edge portion 5a having the shape of an inverted U. The edge portion 5a at the front of the shelf 5 is embedded under the upper edge of the back of the seat 3.

Inside the edge portion 5a at the rear of the shelf 5 are two transverse fixing rods 6 which are slidably mounted in the ends of the rear portion 5a and are supported by intermediate bearings 7. Outer ends 6a of the rods 6 project laterally outside the rear portion 5a and are able to engage into openings 8 made in the wall of the body 1. Helical compression springs 9 disposed around the rods 6, and placed between the bearings 7 and abutments 10 on the rods, bias the ends 6a into engagement with the openings 8. The inner ends 6b of the rods 6 are curved downwards and project beneath the rear portion 5a; these ends 6b form operating fingers for moving the rods 6 against the action of springs 9 so as to release their ends 6a from the openings 8.

The rear portion 5a also carries at each end, rearwardly projecting lugs 11 which support a transverse shaft 12. A curtain in the form of a roller blind 13 with an automatic roll-up action is mounted on the shaft 12 and is enclosed in a protective casing 14. The free edge of the blind 13 is stiffened by a rod 15 and carries an operating tongue 16. At the rear end of the vehicle, the side walls of the body 1 carry two hooks 17 situated substantially at the height of the shelf 5 and into which the ends of the rod 15 can engage when the blind is unrolled as is shown in FIG. 1.

Within the rear portion 5a there is mounted a roller bline 18' which acts as a sun blind and has an automatic roll-up action. The blind 18 is supported by a shaft 19 and is housed in a protective casing 20. The free edge of the blind 18 passes through a slot 21 in the upper part of the rear portion 5a and carries a hooking member 22 which may be fixed to a hook 23 mounted in the vehicle roof in the vicinity of the rear window 2. The sun blind 18 may extend over the entire width of the vehicle, but may alternatively, as will be seen in FIG. 4, be divided into two independent blinds each associated with a different half of the rear seat, with each blind being fixed independently to the vehicle roof.

The shelf 5 and the blind 13 constitute the rear deck of the vehicle for covering the luggage boot 24.

FIG. 5 shows the rear deck in its normal position. The shelf 5 is in position and the blind 13 has been unrolled to its extended position whereby the boot 24 is hidden. Heavy objects 25 can be placed on the shelf 5, while the blind 13 is able to support objects 26 that are relatively light in weight. The load within the boot may be seen at 27.

Figure 6:
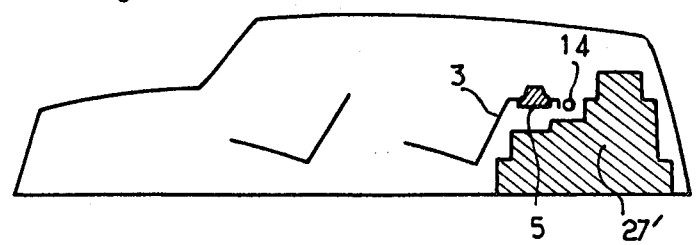
Figure 7:
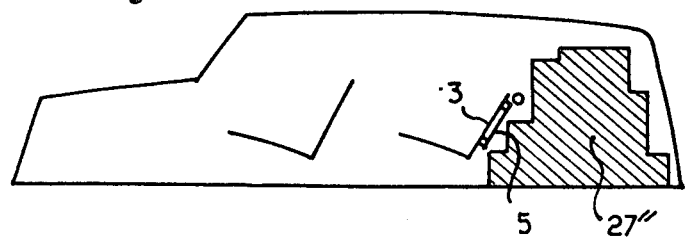

If the load 27' is even more substantial (FIG. 6), the ends 6a of the rods 6 are released from the openings 8 by operating the fingers 6b, and the shelf 5 is withdrawn by causing it to swivel about the upper edge of the back of the seat. The overall size of the unit constituted by the shelf, the blind 13 and the blind 18 is small, so that it can be housed behind the back of the rear seat 3, as may be seen in FIG. 7 and as is shown in broken lines on FIG. 1, the shelf 5 being fixed to the seat back by means of a strap.

If the sun's rays pass through the rear window 2 and causes discomfort to the rear passengers, the blind (or blinds) 18 can be raised and fixed onto the hooks 23. In view of the substantial gap between the blind or blinds 18 and the rear window 2, a "buffer" volume is created which exhibits considerable thermal inertia. The shelf 5 still remains available and constitutes an adequate storage area.

Figure 8:
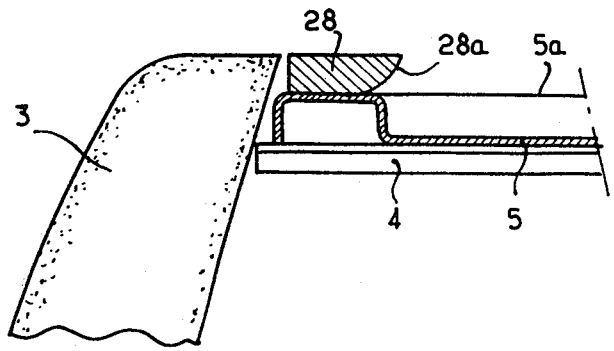
FIG. 8 shows a detail of an alternative arrangement.

In an alternative arrangement shown in FIG. 8, the seat back 3 carries at the top a bracket 28 a bottom face 28a of which is curved inwards and acts as a guide ramp for the shelf 5. To position the shelf 5, it is engaged obliquely between the bracket 28 and the supports 4 and is then swivelled so that it rests on the supports 4. The shelf is locked in position by engaging the ends 6a of the rods 6 into the openings 8.

In the embodiment of FIG. 9, the blind 13' is materially independent of the shelf 5. This blind is wound around a shaft 12' which is parallel with the longitudinal axis of the vehicle and is carried by one of the side walls of the body 1. The free edge of this blind has two eyes 29 which may be engaged on two side studs 30 carried by the opposite side wall of the body. The blind is thus unwound transversely rather than longitudinally of the vehicle. To enable the blind to be fixed under adequate tension to prevent it from floating, the shaft of the winder may be provided with an adjustment pawl cooperating with a toothed wheel 31 fixed on the shaft.

What is claimed is:

1. In a vehicle, the combination which comprises:
    a body having a roof, a rear window, and a luggage boot;
    a rear seat having an upper part and a back;
    a rigid shelf removably fixed to the body in the immediate vicinity of the upper part of the back of the rear seat to extend rearwardly over part of the boot, the length of the shelf in the longitudinal direction of the vehicle being less than that of the luggage boot;
    a flexible roller curtain with automatic return positioned to be spread behind said shelf to cover the remaining part of the boot and to define with the shelf a rear deck;
    at least one roller blind in the form of a sun blind with automatic return, said roller blind being carried by the rear portion of the shelf, said roller blind having a free edge which, in the extended condition of the blind, is located under the roof of the vehicle in front of the upper edge of the rear window; and
    means for fixing the free edge in the extended condition.

2. A vehicle according to claim 1 wherein said flexible roller curtain comprises a roller shaft carried by the rear portion of the shelf such that the flexible roller curtain can be extended longitudinally of the vehicle.

3. A vehicle according to claim 1 wherein the first flexible roller curtain comprises a roller shaft supported by the body of the vehicle behind the shelf such that the blind can be extended transversely of the vehicle.

4. A vehicle according to claim 1 wherein the body further comprises opposed side walls having openings therein, and shelf supports fixed to the side walls, and said shelf comprises retractable fixing means carried at the rear portion of the shelf and engageable into said openings provided in said side walls.

5. A vehicle according to claim 4 wherein the shelf has a front portion embedded under said upper part of the back of the seat.

6. A vehicle according to claim 4, further comprising a holding member disposed behind the seat back, the shelf having a front portion engaged beneath the holding member.

7. A vehicle according to claim 1 wherein the shelf is trough-shaped and has an upstanding peripheral edge portion.

8. A vehicle according to claim 7 wherein said blind comprises a roller shaft housed in the peripheral edge portion at the rear of the shelf.

* * * * *